(12) United States Patent
Cooper et al.

(10) Patent No.: US 6,772,437 B1
(45) Date of Patent: Aug. 3, 2004

(54) CABLE MODEMS AND SYSTEMS AND METHODS FOR IDENTIFICATION OF A NOISE SIGNAL SOURCE ON A CABLE NETWORK

(75) Inventors: Gerald M. Cooper, Gretna, VA (US); Tim E. Dailey, Forest, VA (US)

(73) Assignee: Telefonaktiebolaget LM Ericsson, Stockholm (SE)

( * ) Notice: Subject to any disclaimer, the term of this patent is extended or adjusted under 35 U.S.C. 154(b) by 0 days.

(21) Appl. No.: 09/362,785

(22) Filed: Jul. 28, 1999

(51) Int. Cl.[7] .............................................. H04N 7/173
(52) U.S. Cl. ..................... 725/111; 725/124; 725/125; 725/107; 725/130; 725/126; 455/115.1; 455/115.2; 348/192; 348/193
(58) Field of Search .......................... 348/12, 13, 192, 348/193; 455/5.1, 67.3, 115.1, 116; 725/111, 121, 124–6, 130, 107

(56) References Cited

U.S. PATENT DOCUMENTS

| | | | | |
|---|---|---|---|---|
| 5,790,523 A | * | 8/1998 | Ritchie, Jr. et al. | 370/241 |
| 5,893,024 A | * | 4/1999 | Sanders et al. | 455/5.1 |
| 5,939,887 A | * | 8/1999 | Schmidt et al. | 324/628 |
| 5,943,604 A | * | 8/1999 | Chen et al. | 455/5.1 |
| 6,081,533 A | * | 6/2000 | Laubach et al. | 370/421 |
| 6,094,211 A | * | 7/2000 | Baran et al. | 348/6 |

OTHER PUBLICATIONS

Donald Raskin, Dean Stoneback, *Broadband Return Systems for Hybrid Fiber/Coax Cable TV Networks*, Chapter 13, Network Management, pp. 230–241, 1997.

\* cited by examiner

*Primary Examiner*—Vivek Srivastava
*Assistant Examiner*—Ngoc Vu

(57) ABSTRACT

Cable modems are provided for measuring a noise signal power level on the upstream side of the cable network. The cable modem may be configured to make the signal power measurements at a variety of frequencies and at a selected bandwidth during a specified test time period responsive to a request received from the cable network. Methods and systems are provided for identifying a noise signal source on a cable network including specifying a time window for measurements, the desired measurements and the cable modems from which measurements are desired when the need to initiate a test to identify a noise source is detected. Tests may be initiated based on noise signal measurements by individual cable modems or by the cable services provider which indicate an unacceptable noise level. In addition, the reliability of the test measurements may be improved by not allowing any transmissions on the upstream side during the concurrent test window while cable modems are making the requested measurements. The measurements may then be used to identify which end user location(s) is the source of the noise signal.

24 Claims, 4 Drawing Sheets

CABLE MODEMS AND SYSTEMS AND METHODS FOR IDENTIFICATION OF A NOISE SIGNAL SOURCE ON A CABLE NETWORK

FIELD OF THE INVENTION

The present invention relates to the field of communications in general and more particularly to cable modems and methods for using the same.

BACKGROUND OF THE INVENTION

With the rise in popularity of the Internet and other bi-directional communication services, new demands have been placed upon the existing communications infrastructure to support the provision of such services. One installed system that is capable of supporting such services, is the cable system sometimes referred to as the Cable Television System (CATV) which is typically a coaxial wired connection from a cable system service provider facility to end users. While the CATV system has primarily been used to deliver downstream communications from the cable system to the end users (such as cable television signals), it has the capability to support upstream communications from end users to the CATV system provider. Given the bandwidth limitations of the Public Switched Telephone Network (PSTN) commonly used for communications such as Internet data communications, there have been efforts to provide Internet service over the CATV system. Cable modems have been proposed to support such bidirectional data communications over the cable system at high baud rates rather than through the telephone system. Accordingly, the user may access the Internet over the cable system using a cable modem to provide data rates of 42 million bits per second or higher, particularly as the CATV system in some regions may use fiber optic cabling providing even higher system capacity.

Unfortunately, the demands placed on the upstream side of the cable system to support services such as the Internet are generally much greater than those typically encountered previously with more limited services, such as requesting delivery of pay-per-view movies. The greater volume of information being transmitted places more demands on the available throughput of the upstream side of the cable network. Furthermore, while the downstream side is typically a one-to-many distribution network, the upstream side is a many-to-one distribution network placing further demands on the upstream side of the cable network. Therefore, the sensitivity of the upstream side of the cable network to noise is increased when utilized to support services such as the Internet. This is particularly problematic as one of the largest sources of noise on the cable network is noise ingress from the end user location (such as a subscriber's home). Noise may enter at the back of television sets, at unterminated splitter ports within the home and at other poorly configured in-house cables which often may not be within the control of the operator of the cable system.

SUMMARY OF THE INVENTION

It is, therefore, an object of the present invention to provide cable modems, systems and methods for identifying noise signal sources which may improve the performance of the upstream side of a cable network.

In order to provide for the foregoing and other objectives, cable modems are provided with the ability to measure a noise signal power level on the upstream side of the cable network. The cable modem may be configured to make the signal power measurements at a variety of frequencies and at a selected bandwidth during a specified test time period responsive to a request received from the cable network. Methods and systems are provided for identifying a noise signal source on a cable network including specifying a time window for measurements, the desired measurements and the cable modems from which measurements are desired when the need to initiate a test to identify a noise source is detected. Tests may be initiated based on noise signal measurements by individual cable modems or by the cable services provider which indicate an unacceptable noise level. In addition, the reliability of the test measurements may be improved by not allowing any transmissions on the upstream side during the concurrent test window while cable modems are making the requested measurements. The measurements may then be used to identify which end user location(s) is the source of the noise signal.

In one embodiment of the present invention, a self-testing cable modem is provided which includes a cable modem and a signal measurement circuit. The signal measurement circuit is responsive to the upstream side of the cable network (i.e. channels communicating information from the cable modem over the cable network). The cable modem may include a media access controller coupled to a cable network which has a downstream side to the cable modem and an upstream side from the cable modem. The cable modem in this embodiment further includes a processor coupled to the media access controller and a host interface coupled to a host system. The signal measurement circuit is preferably a signal power measurement circuit.

In a further embodiment of the present invention, the signal power measurement circuit includes a bandpass filter having a selectable center frequency having an input side coupled to the upstream side of the cable network and a power detector coupled to an output side of the bandpass filter. The power detector may be a power integrator. The bandpass filter may also have a selectable bandwidth. The center frequency and bandwidth may be selectable responsive to the processor.

In another embodiment, the processor is configured to receive commands over the cable network specifying a desired center frequency for signal power measurements and a desired bandwidth. The processor further includes means for determining a level of a noise signal on the upstream side of the cable network based on measurements performed by the signal measurement circuit.

In addition, the processor may include means for determining a frequency of occurrence of the noise signal on the upstream side of the cable network based on measurements performed by the signal measurement circuit.

In a further aspect of the present invention methods are provided for identifying a noise signal source on an upstream side of a cable network including cable modems. A test initiation event is first detected. Cable modems selected from the cable modems on the upstream side of the cable network are then identified to participate in a test. Signal power measurements on the upstream side of the cable network are requested from the identified cable modems. The requested signal power measurements are then received from the identified cable modems and at least one of the identified cable modems is identified as the noise signal source based on the received requested signal power measurements.

The test initiation even may be detected by detecting a noise signal level violating a detection criteria on the upstream side of the cable network during normal operating conditions of the cable system. Alternatively, an indication of a test initiation event may be received from at least one of the cable modems over the upstream side of the cable network. The noise signal source may be identified by identifying at least one of the identified cable modems which provided signal power measurements violating a selection criteria as the noise signal source. Furthermore, after the noise signal source is identified, a corrective action for the identified noise signal source may be initiated.

In one embodiment, after the cable modems are identified for the test, a test time window is determined and the request for signal power measurements specifies the test time window for the requested signal power measurements by all of the identified cable modems. In addition, a plurality of the cable modems on the upstream side of the cable network which are coupled to a branch of the upstream side of the cable network which includes at least one of the identified cable modems may be notified that no transmissions on the upstream side of the cable network should be generated during the test time window. The notified plurality of the cable modems may include the identified cable modems and may further include at least one cable modem which is not one of the identified cable modems.

In a further aspect of the present invention, a method is provided for identifying a noise signal source on a cable network. A request for signal power measurements on an upstream side of the cable network at the cable modem is received by the cable modem over a downstream side of the cable network. A signal power is then measured on the upstream side of the cable network at the cable modem and the measured signal power is provided to a remote location over the cable network. The received request for a power measurement may specify a time period for measurement and at least one frequency for measurement and the signal power may be measured during the specified time period and at the specified at least one frequency to provide the measured signal power. In one embodiment, transmissions on the upstream side of the cable network are suspended during the specified time period.

While the present invention has been described above in part with reference to method aspects, corresponding systems are also provided.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. As will be appreciated by those of skill in the art, the present invention may be embodied as methods or devices. Accordingly, the present invention may take the form of a hardware embodiment, a software embodiment or an embodiment combining software and hardware aspects.

Figure 1:
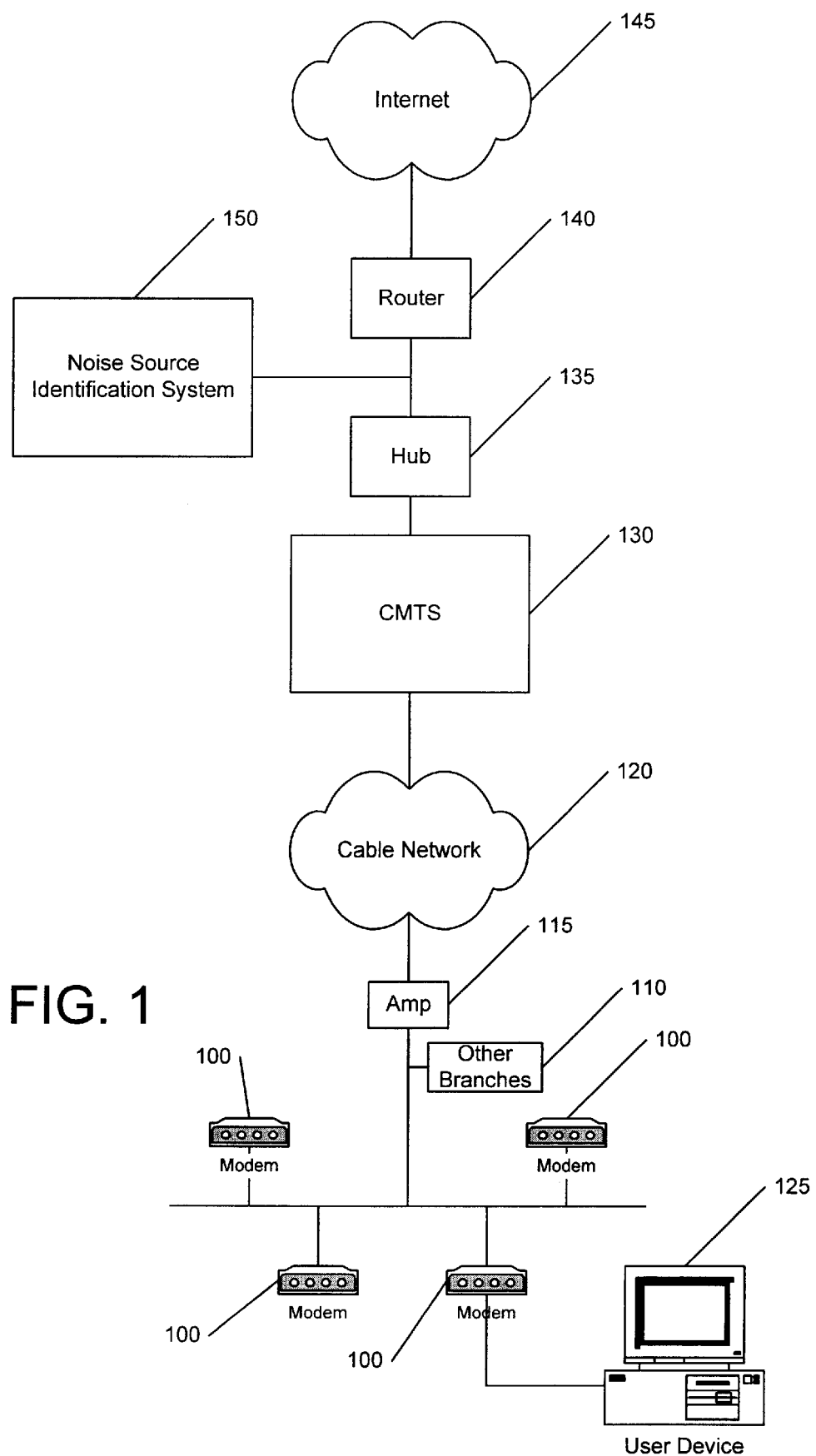
FIG. 1 schematically illustrates cable modems and systems and methods for identifying a noise signal source in a CATV operating environment according to an embodiment of the present invention.

Referring now to FIG. 1, an embodiment of a cable system including cable modems according to an embodiment of the present invention will now be described. As shown in FIG. 1, a plurality of cable modems 100 are connected to a branch of a cable network 120 which branch connects to the remainder of the cable network 120 through an amplifier 115. The illustrated branch may, for example, service a plurality of houses within a neighborhood. There may be additional branches 110 serving, for example, other neighborhoods.

Various devices in the end user location such as a subscriber's home may exist on the subscriber side of the cable modem 100. One such exemplary user device 125 is illustrated as connected to one of the cable modems 100. The user device 125 may be, for example, a personal computer which is configured to obtain access for communications over the Internet 145. It is to be understood that each of the cable modems 100 may also support other user devices within the subscriber's home, all interfaced through a cable modem 100.

The cable network 120 figuratively illustrative in FIG. 1 includes cabling infrastructure such as coaxial cable or fiber optic cables connecting the remote subscriber locations to a Cable Modem Termination System or Cable Modem Terminal Server (CMTS) 130. The CMTS 130 can provide services, such as television service, telephone service, and Internet service to subscribers of the cable system via the cable modems 100 by transferring data over the cable network 120. For example, an end user may access the Internet 145 through the respective cable modem 100 from the user device 125.

The CMTS 130 manages the services provided to the respective subscribers in the cable system. For example, a first subscriber may receive television, telephone and Internet services while a second subscriber may receive only Internet service. Moreover, different subscribers may receive a different quality of service. For example, a first subscriber may receive Internet service at relatively low bandwidth while a second subscriber may receive Internet service at relatively high bandwidth. Accordingly, the CMTS 130 transmits and receives data to and from the respective cable modems 100 at the rates associated with the respective subscribers.

The CMTS 130 may also transmit control messages to the cable modems 100. For example, a specific cable modem 100 may be identified as a target destination for a particular control message using a media access controller (MAC) address uniquely associated with each respective cable modem 100. Through the use of such control messages, the CMTS 130 may, for example, adjust parameters of the cable modems 100 such as phase timing, frequencies and power levels associated with the transfer of data between the respective cable modems 100 and the CMTS 130. For multiple access Internet access over the cable network 120, the CMTS 130 may, for example, provide a specific channel or frequency to respective ones of the cable modems 100 for use in transmitting messages to and receiving messages from the Internet 145. The CMTS 130 operates to route transmissions between accessing user devices 125 and the Internet 145 through the respective cable modems 100.

It will be understood by those of skill in the art, that the data transfers between the CMTS 130 and the cable modems 100 may be performed according to standards known in the art. For example, data transfers between the CMTS 130 and the cable modems 100 may be performed using a time division multiple access (TDMA) technique wherein data is transmitted and received over the cable network 120 using channels identified as a pre-defined time slot or slots at a frequency. Standards for the transfer of data in cable systems are discussed in the Data Over Cable System Interface Specification (DOCSIS) published by Cable Television Laboratories Incorporated.

When the cable modems 100 are turned on, the cable modems 100 typically perform an initialization sequence wherein the cable modems 100 register with the cable system provider controlling access to the cable network 120. In particular, the cable modems 100 preferably transfer an identifier, such as the MAC address, to the CMTS 130 which identifies the cable modem 100 on the cable network 120. Accordingly, the CMTS 130 may subsequently communicate with the respective cable modems 100 using the cable modem's respective identifiers.

As shown in FIG. 1, the CMTS 130 in the illustrated embodiment is connected through a hub 135 to a router 140. The router 140, in turn, provides access for communications over the Internet 145.

Also connected to the hub 135 is a noise source identification system 150 according to an embodiment of the present invention. Operations of the noise source identification system 150 will be described further herein more particularly with reference to FIG. 3. While illustrated separately, the noise source identification system 150 may be implemented as code executing on a device which also acts as the hub 135 or the CMTS 130.

Figure 2:
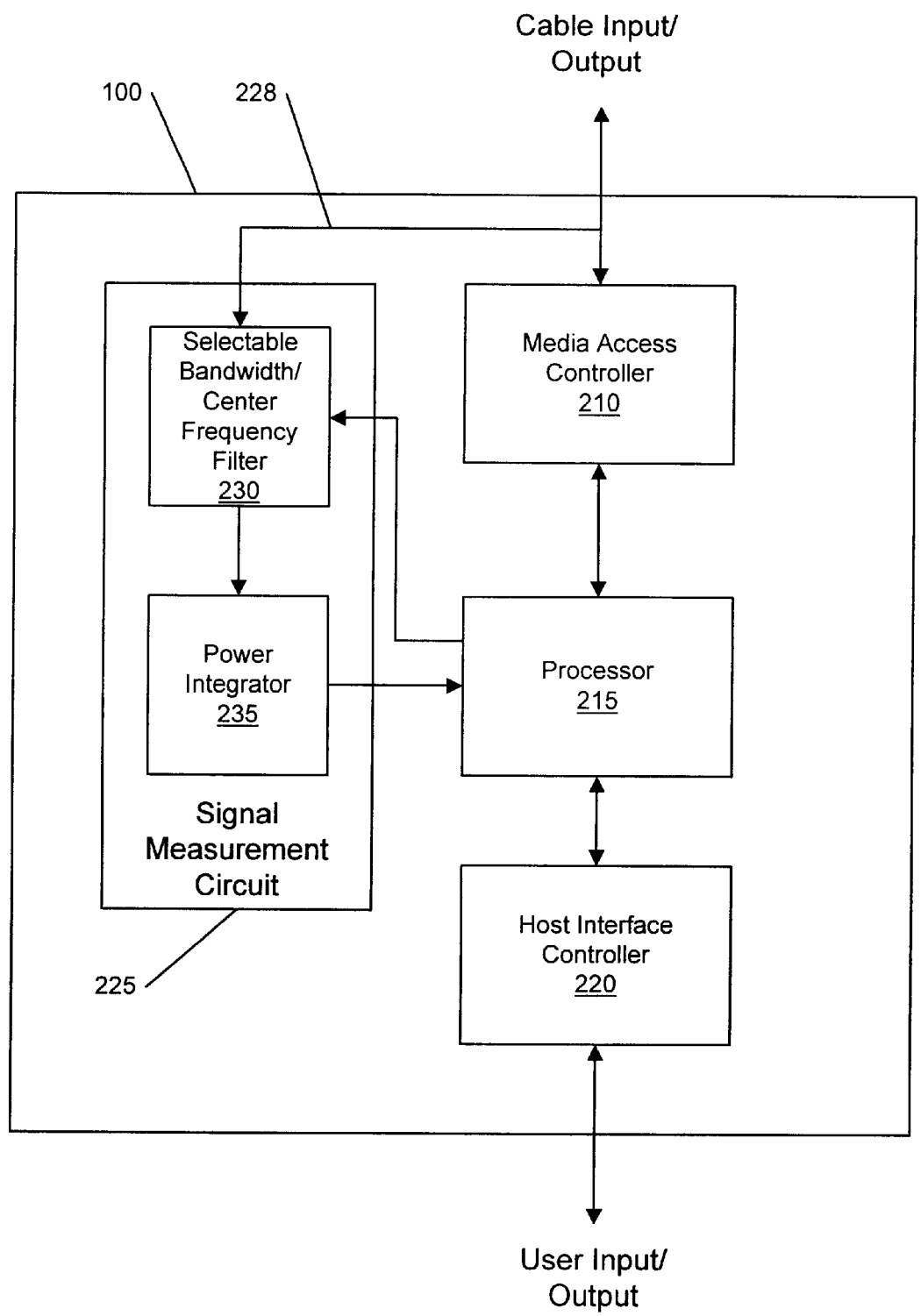
FIG. 2 is a block diagram of a cable modem according to an embodiment of the present invention.

Referring now to FIG. 2, a block diagram of an embodiment of a cable modem 100 as shown in FIG. 1 is provided. Data is transferred between the CMTS 130 and the cable modem 100 by a media access controller 210 coupled to the cable network 120. The MAC 210 accepts data transfers from the CMTS 130 if the identifier included in the data transfer matches the associated identifier of the cable modem 100. The data transfer can include information intended for one or more devices at the subscriber location such as the user device 125 (shown in FIG. 1). The data transfers may include an address specifying which end user device coupled to the cable modem 100 is the ultimate destination of the data transfer.

Although not shown specifically in FIG. 2, the MAC 210 may be coupled to a radio frequency (RF) tuner or other circuitry that modulates and demodulates the data included in the data transfers to put the data in an appropriate form for transmission over the cable network 120. For example, data transfers from the CMTS 130 may be received over a channel on the downstream side of the cable network 120 and demodulated by a demodulator, such as an RF tuner, and provided to the MAC 210. In turn, data transfers to the CMTS 140 may be modulated and transferred over a second channel on the upstream side of the cable network 120. As used herein, the term "upstream side" refers to communications to the CMTS 130 from a cable modem 100 and the term "downstream side" refers to communications from the CMTS 130 to the cable modem 100. It is further to be understood that the upstream side and downstream side of the cable network 120 will typically not be provided by separate physical cabling but will instead be allocated a different channel or channels. For example, the downstream side may be allocated a different frequency range at which signals are modulated (carrier frequency) than the upstream side.

A processor 215 coordinates operations of the cable modem 100 to provide the selected services to the subscriber. A host interface controller (HIC) 220 provides the data received by the processor 215 to the addressed user device and provides data from user devices to the processor 215 for transfer to the CMTS 130. The host interface controller 220 may be a controller suitable for interfacing to at least one user device, using, for example, an ethernet, a universal serial bus (USB) or other type of interface known to those of skill in the art.

As shown in FIG. 2, the cable modem 100 further includes a signal measurement circuit 225 which is coupled to the upstream side of the cable network 120 through interface 228 so as to provide access to the upstream side of the cable network 120 for signal measurement. Preferably, the signal measurement circuit is a signal power measurement circuit.

The signal measurement circuit 225 in the illustrated embodiment includes a bandpass filter 230 having a selectable center frequency and, preferably a selectable bandwidth. The input side of the bandpass filter 230 is coupled over the interface 228 to the upstream side of the cable network 120. The output side of the bandpass filter 230 is connected to a power detector 235 or other power measurement means. Those of skill in the art will understand that the signal power measurement circuit 225 may be provided by a power detector such as a power integrator as well as by using other techniques such as spectral power measurements using Fast Fourier Transforms (FFTs). It will also be understood that techniques such as FFTs may operate by applying a broadband power analysis and selecting out from that analysis the frequency spectrum ranges of interest thereby providing both the bandpass filter and the power detector in a single circuit which may be implemented as code executing on a processor or as a custom device. The power detector may determine the power of a signal being measured by integrating the received signal from the bandpass filter 230 during the measurement time period and may, for example, include a peak detector circuit.

The center frequency and bandwidth of the bandpass filter 230 in the embodiment shown in FIG. 2 are set responsive to commands from the processor 215. The processor 215 is configured to receive commands from the noise source identification system 150 over the cable network 120 which commands specify the desired center frequency for power measurements and desired bandwidth for power measurements for a particular test protocol as will be described further with reference to the flowcharts of FIGS. 3 and 4. The processor 215 is further coupled to the power integrator 235 and provides a means for determining a level of a noise signal on the upstream side of the cable network 120 based on the measurements performed by the signal measurement circuit 225. For example, the measurements from the power integrator 235 may be digitized and accumulated by the processor 215 and put into proper form for a return transmission to the noise source identification system 150 over the cable network 120.

In various embodiments, the signal processing capabilities of processor 215 may be utilized to identify the frequency of a noise signal and a rate of occurrence of a noise signal on the upstream side of the cable network 120 as seen at the cable modem 100 based on measurements performed by the signal measurement circuit 225. Alternatively, raw sample data from the signal measurement circuit 225 may be transmitted to the noise source identification system 150 for further processing and characterization of the measured noise signals.

As will be appreciated by those of skill in this art, the above-described aspects of the present invention in FIG. 1 and FIG. 2 may be provided by hardware, software, or a combination of the above. While various components of the cable modem 100 have been illustrated in FIG. 2, in part, as discrete elements, they may, in practice, be implemented by a microcontroller including input and output ports and running software code, by custom or hybrid chips, by discrete components or by a combination of the above. For example, media access controller 210 and signal measurement circuit 225 may be implemented in part as code executing on a processor 215. Similarly, the noise source identification system 150 illustrated in FIG. 1, may, in practice, be implemented by a microcontroller including input and output ports and running software code, by custom or hybrid chips, by discrete components or by a combination of the above.

Operations of the present invention will now be described with respect to the flowchart illustrations of FIG. 3 and FIG. 4. It will be understood that each block of the flowchart illustrations, and combinations of blocks in the flowchart illustrations, can be implemented by computer program instructions. These program instructions may be provided to a processor to produce a machine, such that the instructions which execute on the processor create means for implementing the functions specified in the flowchart block or blocks. The computer program instructions may be executed by a processor tocause a series of operational steps to be performed by the processor to produce a computer implemented process such that the instructions which execute on the processor provide steps for implementing the functions specified in the flowchart block or blocks.

Accordingly, blocks of the flowchart illustrations support combinations of means for performing the specified functions, combinations of steps for performing the specified functions and program instruction means for performing the specified functions. It will also be understood that each block of the flowchart illustrations, and combinations of blocks in the flowchart illustrations, can be implemented by special purpose hardware-based systems which perform the specified functions or steps, or combinations of special purpose hardware and computer instructions.

Figure 3:
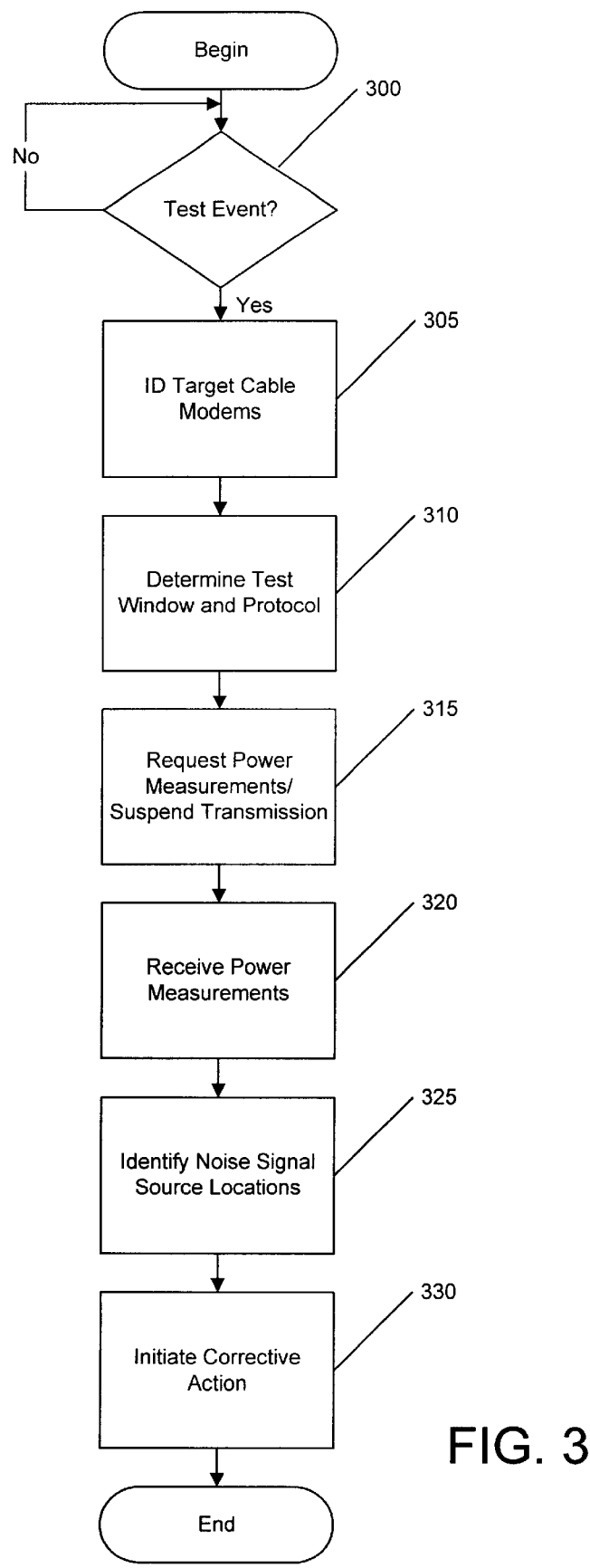
FIG. 3 is a flowchart illustrating operations for an embodiment of the present invention with reference to operations by a noise source identification system.

Referring now to the flowchart illustration of FIG. 3, operations according to an embodiment of the present invention for identifying a noise signal source on an upstream side of a cable system using cable modems 100 will be further described. More particularly, the flowchart of FIG. 3 illustrates noise identification operations from the perspective of the noise source identification system 150. Operations begin at block 300 with the detection of a test initiation event by the noise source identification system 150. For example, in one embodiment, the noise source identification system 150 monitors the entire cable network 120 at the headend of the network through CMTS 130 for noise ingress problems. This monitoring may occur during normal operations of the cable network 120 and when a noise signal level violating a detection criteria is detected on the upstream side of the cable network 120 during these normal operating conditions a test initiation event may be recognized by the noise source identification system 150.

Alternatively, a test initiation event may be detected based on an exception report received from a cable modem 100. Such an indication of the need for initiation of a test may be triggered by cable modem 100, for example, based on detection of a noise signal level on the upstream side of the cable network 120 at the cable modem 100 by signal measurement circuit 225. This exception event detection may be provided by configuring the cable modem 100 to periodically make noise signal measurements for the purpose of detecting unacceptable noise level events.

To initiate a test event, the noise source identification system 150 establishes various criteria for the test to identify the noise signal source or sources. One or, preferably, more cable modems are selected from the cable modems that are coupled to the upstream side of the cable network 120 to participate in the test being initiated by the noise source identification system 150 (block 305). For example, all of the cable modems 100 in a particular neighborhood on the cable network 120 could be included in the test. Such an approach may be appropriate where the noise source can, in part, be isolated by the noise source identification system 150 as occurring on a particular branch of the cable network 120. This would be the case, for example, where the test was initiated based upon an exception report from a specific cable modem 100 on a particular node of the cable network 120. Alternatively, where the source cannot be so limited, the test may include measurements by all of the cable modems 100 on the cable network 120.

In addition to identifying target cable modems 100 to include in the test, a test time window is preferably specified along with a test protocol (block 310). By specifying a test time window, the identified cable modems 100 may all sample a designated portion of the signal spectrum of the upstream side of the cable network 120 simultaneously during a test period. A test period, for example, may be specified to occur when the noise source is known or expected to be active. This may be particularly beneficial where intermittent noise problems are identified, such as may occur when a particular end user device coupled to the cable network 120 generates noises on the upstream side of the cable network 120 only when in active use. An example would be a situation such as when a subscriber modifies the cable wiring within his residence and inadvertently creates a noise ingress situation. Subsequently, the subscriber may activate a device, such as a video game, on an intermittent basis which generates noise on the upstream side of the cable network 120 through the noise ingress situation inadvertently created by the subscriber.

The test protocol for identifying a noise signal source may take a variety of forms. For example, the test may actually be implemented as a sequence of tests over a sequence of time windows with a progressively narrower frequency bandwidth as the particular characteristics of a noise source are identified. In this case, the test is preferably broken into a sequence of test windows providing an opportunity for analysis from the results of the first pass at a first higher bandwidth of noise measurement to be utilized to narrow the search to a tighter bandwidth in the subsequent test window, thereby providing the potential for a more accurate determination of the frequency and rate of occurrence of a noise source as well as the location of the noise source. Alternatively, a test protocol may specify a single test window with a plurality of different noise signal power measurements occurring within the test window utilizing, for example, a plurality of selected center frequencies for the desired measurements.

Once the test window and test protocol have been identified at block 310, the power measurements on the upstream side of the cable network 120 are requested from the identified cable modems 100 (block 315). The request to the cable modems 100 may include a specification of the test time window for the requested power measurements by the identified cable modems 100 and may further specify the protocol of the test. In addition, in the illustrated embodiment of FIG. 3, operations at block 315 include suspension of transmissions on the upstream side of the cable network 120 by the cable modems 100. For example, in one scenario the noise source has been identified as residing on a specific branch of the cable network and a plurality of the cable modems 120 on the branch have been identified to participate in the test although other cable modems 120 on this branch may not participate. Various of the cable modems 100 on this branch (i.e. which are coupled to the upstream side of the cable network 120 on the branch) are notified that no transmissions should be sent on the upstream side of the cable network 120 during the test time window. In general, the plurality of cable modems being requested to suspend generation of transmissions on the upstream side of the cable network 120 will include all of the identified cable modems 100 participating in the test. However, it may also include additional cable modems 100 which are not themselves making measurements as part of the test but which could nonetheless influence the test in an undesired fashion by transmissions on the upstream side of the cable network 120.

After the test window has occurred and the cable modems 100 have had an opportunity to make the requested power measurements, the noise source identification system 150 receives the power measurements, preferably by transmissions from the cable modems 100 over the upstream side of the cable network 120 (block 320). The noise source identification system 150 may then accumulate the measurements from all of the identified cable modems 100 participating in the test and, based on that information, may identify at least one of the cable modems 100 as the noise signal source based on the received requested power measurements. For example, any of the identified cable modems 100 which provided power measurements violating a selection criteria may be identified as the noise signal source.

The node wide snapshot of noise characteristics may be analyzed automatically or by an operator interacting with a user input/output interface of the noise source identification system 150. A source of noise ingress may thereby potentially be quickly isolated or, alternatively, a further search area may be at least narrowed before manual maintenance intervention is initiated. Furthermore, by utilizing a common specified test time window and suspending transmissions on the upstream side during the test time window, more accurate and reliable measurements may be generated from the test to increase the likelihood of an accurate identification of the noise signal source on the cable network 120.

As further illustrated in FIG. 3, the benefits of the present invention in identifying a noise source on the cable system may be utilized to initiate a corrective action for the identified noise signal source (block 330). For example, a technician may be directed to proceed to an identified noise signal source location to initiate repairs to correct the noise ingress situation. The system maintenance burden is thereby beneficially impacted by utilization of the systems, methods and cable modems of the present invention as the often tedious and time consuming task of isolating the noise signal source may be greatly simplified. This may be particularly beneficial as conventionally such isolation may require a technician to drive to various points within the coverage area and possibly climb poles or be required to take other potentially dangerous steps to successively divide the area of uncertainty of the noise source until the problem is isolated.

Such conventional manual investigation by a technician in the field may be time consuming and expensive in the best of conditions and may be exacerbated by unfavorable weather conditions which are themselves a factor in triggering the very noise ingress problems identified by the present invention. The promptness, costs and safety of cable network maintenance may thereby be beneficially affected by the present invention. Furthermore, the present invention is particularly advantageous in addressing intermittent noise problems which, simply by the intermittent nature of the noise source itself, may have a greater potential to mislead a technician working in the field in isolating the noise source simply by the intermittent nature of the noise source itself.

An alternative approach to the corrective action at block 330 could include utilization of an embodiment of the cable modem 100 which is configured as a direct interface point between the cable network 120 and all user devices 125 within a subscriber home. Where the cable modem 100 is installed such that the cable wiring within the subscriber home is all downstream of the cable modem 100, the cable modem 100 may be used to isolate a particular subscriber home from the cable network 120. For example, the cable modem 100 could be modified to include a switch which may be activated by the processor 215 responsive to commands from the noise source identification system 150 transmitted over the cable network 120. In this embodiment, the corrective action once a particular cable modem 100 is identified as a noise signal source may include transmission of a control message from the noise source identification system 150 to the noise signal source cable modem 100 initiating operation of the switch disconnecting the subscriber home from the cable network 120. Accordingly, the noise signal source may be removed from the cable network 120 as soon as it is identified, thereby providing immediate improvements to the performance level of the upstream side of the cable network 120 for the remaining subscribers. A technician may then be directed to the particular subscriber home which has been switched off-line to undertake the necessary repairs and allow the subscriber to resume access to the cable network 120. Furthermore, the switch within the cable modem 100 may, alternatively, only isolate a particular subscriber location from access to the upstream side of the cable network 120 so that the subscriber will still be able to receive downstream transmissions such as cable television signals.

A further alternative corrective action would be to switch the cable modems 100 to a different upstream channel. More particularly, the frequency range of the noise source could be characterized from the measurements and the portion of the upstream channel affected by the noise source could be taken out of use and alternative channels, less subject to the noise source could then be utilized.

Referring now to the flowchart illustration of FIG. 4, operations according to an embodiment of the present invention will now be further described with reference to the cable modem 100. Operations begin at block 400 when a cable modem 100 receives a request for power measurements on the upstream side of the cable network 120. The request itself may be received by the cable modem 100 over the downstream side of the cable network 120 to provide for fully automated test initiation. The cable modem 100 then obtains the specified time period for the test and the test protocol, such as a specified at least one frequency to be measured at a specified bandwidth, from the received request (block 405). The cable modem 100 then waits for the specified time period for the power measurements (block 410).

Figure 4:
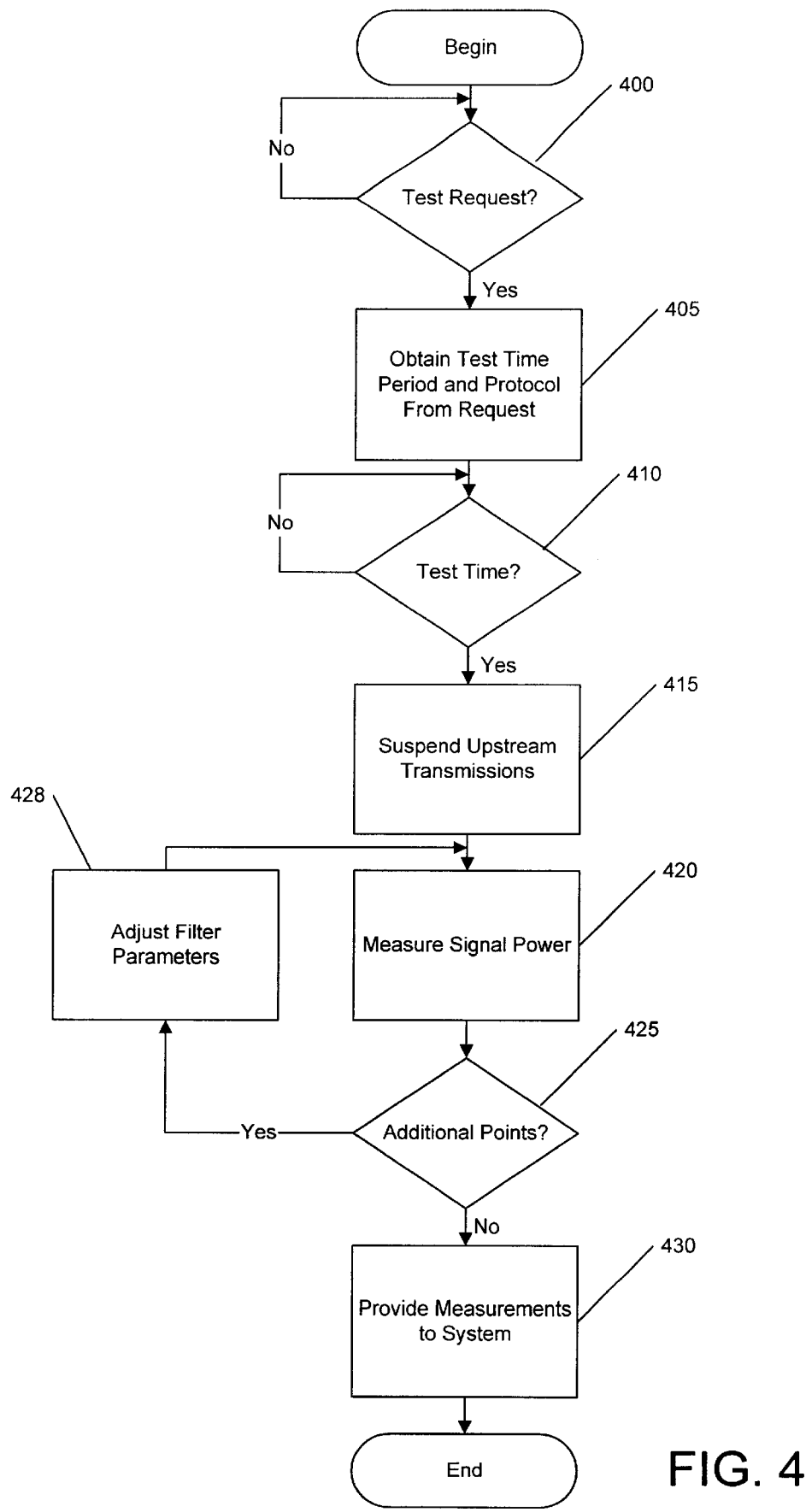
FIG. 4 is a flowchart illustrating operations for an embodiment of the present invention with reference to operations by a cable modem.

In the embodiment of FIG. 4, once the time for measurement arrives, the cable modem 100 suspends upstream transmissions from the user location in preparation for noise signal power measurements (block 415). The signal power on the upstream side of the cable network 120 at the cable modem is then measured by the cable modem 100 (block 420). If the test protocol specifies a plurality of measurements at different frequencies and/or bandwidths, the cable modem 100 determines if additional points are required for the measurement (block 425). If additional measurement points are specified by the test protocol, the cable modem 100 appropriately adjusts the bandwidth and center frequency of the signal measurement circuit 225 (block 428) and returns to execute operations at block 420 using the new settings.

Once all of the specified measurements have been generated, the measured signal power is provided to the noise source identification system 150 (block 430). The noise signal power measurements may be provided as raw measured data or may be processed by the processor 215 before forwarding to the noise source identification system 150.

As described above, the CMTS 130 may initiate signal power measurements by cable modems 100 by transmitting commands over the cable network 120. The message structure for initiating measurements may be provided with a format such as that illustrated in the embodiment described in Table 1 below.

TABLE 1

| Field | Function | Description |
|---|---|---|
| Command ID | Identifies message as a measurement command. | May be a single message or a chained plurality of messsages, for example, if the information exceeds the allocated size for a single message. |
| Address Type/ Address | Specifies cable modem(s) to which the message is addressed. | May designate, for example, a single cable modem, a plurality of cable modems or all cable modems on the node. |
| Measurement Mode | Defines measurement technique to use. | May specify, for example, a single sample, averaging over a number of samples or continuous averaging. |
| Reporting Mode | Defines how to report measurements. | May specify, for example, autonomous response when ready, wait for poll, or report only on measurement exceeding a threshold. |
| Threshold | Defines a noise threshold for use, for example, when an exception reporting reporting mode is specified. | |
| Minimum Frequency | Defines a lower frequency bound of a measurement range. | |
| Maximum Frequency | Defines an upper frequency bound of a measurement range. | |
| Sample Rate | Defines how often samples are to be taken. | |

In the drawings and specification, there have been disclosed typical preferred embodiments of the invention and, although specific terms are employed, they are used in a generic and descriptive sense only and not for purposes of limitation, the scope of the invention being set forth in the following claims.

That which is claimed:

1. A self-testing cable modem for testing a cable network, the self-testing cable modem comprising:
   a media access controller coupled to a cable network, the cable network having a downstream side to the cable modem and an upstream side from the cable modem;
   a processor coupled to the media access controller; and
   a host interface coupled to a host system;
   a signal power measurement circuit responsive to an upstream side of the cable network, the signal power measurement circuit comprising:
      a bandpass filter having a selectable center frequency having an input side coupled to the upstream side of the cable network;
      a power detector coupled to an output side of the bandpass filter; and
   wherein the selectable center frequency is selectable responsive to the processor and wherein the processor is configured to receive commands over the cable network specifying a desired center frequency for power measurements and wherein the power detector is a power integrator.

2. A cable modem according to claim 1 wherein the bandpass filter has a selectable bandwidth and wherein the selectable bandwidth is selectable responsive to the processor and wherein the processor is configured to receive commands over the cable network specifying a desired bandwidth for power measurements.

3. A cable modem according to claim 1 wherein the processor further comprises means for determining a level of a noise signal on the upstream side of the cable network based on measurements performed by the signal measurement circuit.

4. A cable modem according to claim 3 wherein the processor further comprises means for determining a frequency of occurrence of the noise signal on the upstream side of the cable network based on measurements performed by the signal measurement circuit.

5. A method for identifying a noise signal source on an upstream side of a cable network including cable modems, the method comprising:
   detecting a test initiation event;
   identifying cable modems selected from the cable modems on the upstream side of the cable network to participate in a test;
   requesting signal power measurements on the upstream side of the cable network from the identified cable modems;
   receiving the requested signal power measurements from the identified cable modems; and
   identifying at least one of the identified cable modems as the noise signal source based on the received requested signal power measurements.

6. A method according to claim 5 wherein the step of detecting comprises the step of detecting a noise signal level violating a detection criteria on the upstream side of the cable network during normal operating conditions of the cable system.

7. A method according to claim 5 wherein the step of detecting comprises the step of receiving an indication of a test initiation event from at least one of the cable modems over the upstream side of the cable network.

8. A method according to claim 5 wherein the step of identifying cable modems is followed by the step of determining a test time window and wherein the step of requesting signal power measurements further comprises the step of specifying the test time window for the requested signal power measurements by all of the identified cable modems.

9. A method according to claim 8 wherein the step of requesting signal power measurements further comprises the step of notifying a plurality of the cable modems on the upstream side of the cable network which are coupled to a branch of the upstream side of the cable network which includes at least one of the identified cable modems that no transmissions on the upstream side of the cable network should be generated during the test time window.

10. A method according to claim 9 wherein the plurality of the cable modems includes the identified cable modems.

11. A method according to claim 10 wherein the plurality of the cable modems includes at least one cable modem which is not one of the identified cable modems.

12. A method according to claim 8 wherein the step of identifying at least one of the identified cable modems comprises the step of identifying any of the identified cable modems which provided signal power measurements violating a selection criteria as the noise signal source.

13. A method according to claim 12 wherein the step of identifying at least one of the identified cable modems is followed by the step of initiating a corrective action for the identified noise signal source.

14. A method for identifying a noise signal source on a cable network, the method comprising:
receiving over a downstream side of the cable network at a cable modem a request for signal power measurements on an upstream side of the cable network at the cable modem;
measuring a signal power on the upstream side of the cable network at the cable modem; and
providing the measured signal power to a remote location over the cable network.

15. A method according to claim 14 wherein the step of receiving further comprises the step of receiving a request for signal power measurement specifying a time period for measurement and at least one frequency for measurement and wherein the measuring step further comprises the step of measuring the signal power during the specified time period and at the specified at least one frequency to provide the measured signal power.

16. A method according to claim 14 wherein the step of measuring is preceded by the step of suspending transmissions on the upstream side of the cable network during the specified time period.

17. A system for identifying a noise signal source on an upstream side of a cable network including cable modems, the system comprising:
means for detecting a test initiation event;
means for identifying cable modems selected from the cable modems on the upstream side of the cable network to participate in a test;
means for requesting signal power measurements on the upstream side of the cable network from the identified cable modems;
means for receiving the requested signal power measurements from the identified cable modems; and
means for identifying at least one of the identified cable modems as the noise signal source based on the received requested signal power measurements.

18. A system according to claim 17 wherein the means for detecting comprises means for detecting a noise signal level violating a detection criteria on the upstream side of the cable network during normal operating conditions of the cable system.

19. A system according to claim 17 further comprising means for determining a test time window and wherein the means for requesting signal power measurements further comprises means for specifying the test time window for the requested signal power measurements by all of the identified cable modems.

20. A system according to claim 19 wherein the means for requesting signal power measurements further comprises means for notifying a plurality of the cable modems on the upstream side of the cable network which are coupled to a branch of the upstream side of the cable network which includes at least one of the identified cable modems that no transmissions on the upstream side of the cable network should be generated during the test time window.

21. A system according to claim 20 wherein the means for identifying at least one of the identified cable modems comprises means for identifying any of the identified cable modems which provided signal power measurements violating a selection criteria as the noise signal source.

22. A system for identifying a noise signal source on a cable network comprising:
means for receiving over a downstream side of the cable network at a cable modem a request for signal power measurements on an upstream side of the cable network at the cable modem;
means for measuring a signal power on the upstream side of the cable network at the cable modem; and
means for providing the measured signal power to a remote location over the cable network.

23. A system according to claim 22 wherein the means for receiving further comprises means for receiving a request for power measurement specifying a time period for measurement and at least one frequency for measurement and wherein the means for measuring further comprises means for measuring the signal power during the specified time period and at the specified at least one frequency to provide the measured signal power.

24. A system according to claim 23 further comprising means for suspending all transmissions on the upstream side of the cable network during the specified time period.

* * * * *